United States Patent
Mattes

(10) Patent No.: US 6,737,764 B2
(45) Date of Patent: May 18, 2004

(54) CIRCUIT ARRANGEMENT FOR THE POWER SUPPLY OF PROTECTIVE DEVICES FOR THE PASSENGERS OF A VEHICLE

(75) Inventor: Bernhard Mattes, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/048,746

(22) PCT Filed: May 4, 2001

(86) PCT No.: PCT/DE01/01701

§ 371 (c)(1),
(2), (4) Date: Jul. 16, 2002

(87) PCT Pub. No.: WO01/92066

PCT Pub. Date: Dec. 6, 2001

(65) Prior Publication Data

US 2002/0180268 A1 Dec. 5, 2002

(30) Foreign Application Priority Data

May 31, 2000 (DE) .......................................... 100 27 007

(51) Int. Cl.⁷ .............................................. B60R 21/32
(52) U.S. Cl. ...................... 307/109; 307/10.1; 320/103; 320/166; 180/271; 280/728.1
(58) Field of Search ................................ 307/109, 10.1; 320/103, 116, 126, 166, 167; 180/271, 274; 280/728.1, 734

(56) References Cited

U.S. PATENT DOCUMENTS

| | | | |
|---|---|---|---|
| 5,158,323 A | * | 10/1992 | Yamamoto et al. ........ 307/10.1 |
| 5,522,617 A | * | 6/1996 | Swart .......................... 280/735 |
| 5,597,179 A | * | 1/1997 | Kornhauser ................ 280/735 |
| 5,621,326 A | * | 4/1997 | Watanabe et al. ........... 280/735 |
| 5,621,607 A | * | 4/1997 | Farahmandi et al. ........ 361/502 |
| 5,646,454 A | * | 7/1997 | Mattes et al. .............. 307/10.1 |
| 5,859,583 A | * | 1/1999 | Mayumi et al. ............ 280/735 |
| 5,936,313 A | * | 8/1999 | Cook et al. ................ 307/10.1 |
| 6,072,691 A | * | 6/2000 | Suhara et al. .............. 307/109 |
| 6,114,777 A | * | 9/2000 | Hermann ................... 307/10.1 |
| 6,225,707 B1 | * | 5/2001 | Hermann ................... 307/10.1 |
| 6,305,709 B1 | * | 10/2001 | Okada ........................ 280/735 |
| 6,580,279 B1 | * | 6/2003 | Baumgartner et al. ..... 307/10.1 |

FOREIGN PATENT DOCUMENTS

| | | |
|---|---|---|
| EP | 0 629 161 | 12/1994 |
| EP | 0 895 901 | 2/1999 |
| EP | 0 927 117 | 7/1999 |
| WO | 91 05680 | 5/1991 |
| WO | 99 29540 | 6/1999 |

\* cited by examiner

*Primary Examiner*—Gregory J. Toatley, Jr.
*Assistant Examiner*—Roberto J. Rios
(74) *Attorney, Agent, or Firm*—Kenyon & Kenyon

(57) ABSTRACT

In order that the circuit arrangement ensures a high availability of the protective functions of all necessary passenger protection devices, it includes multiple double-layer capacitors connected in series and an electrolytic capacitor, which obtains its charge from the double-layer capacitors, which have a higher capacitance but a lower nominal voltage than the electrolytic capacitor. The electrolytic capacitor exclusively supplies the triggering voltage necessary for the trigger power modules of the protective devices.

4 Claims, 1 Drawing Sheet

CIRCUIT ARRANGEMENT FOR THE POWER SUPPLY OF PROTECTIVE DEVICES FOR THE PASSENGERS OF A VEHICLE

FIELD OF THE INVENTION

The present invention relates to a circuit arrangement for the power supply of protective devices for vehicle passengers, having a capacitor arrangement which provides the energy necessary for triggering the protective devices.

BACKGROUND INFORMATION

The passenger protection systems installed in motor vehicles—these include airbags, seat belts, etc.—are becoming more and more complex over time. Particularly the number of airbags installed in vehicles is becoming ever greater. The restraint devices are to be triggerable in multiple sequential stages in order to offer protection to the passengers even in the event of multiple sequential impacts. In the future, due to the necessary complexity of the protective devices, there will be more than 20 triggering circuits for triggering the individual restraint devices.

In order that all of the restraint devices present in the vehicle can still be activated in the event of a crash even if the power supply in the vehicle is interrupted, an energy store is provided in the vehicle, which supplies the trigger power modules of the individual restraint devices with the necessary energy in case of triggering, as described, for example, in WO 99/29540. An energy store of this type comprises one or more capacitors. As a rule, electrolytic capacitors are currently used, whose overall volume becomes ever larger the more triggering circuits there are to be supplied with energy. In the event of multiple impacts, if a time delay is necessary during the activation of the individual triggering circuits, the electrolytic capacitor must have a long storage time, which, however, is only possible with a capacitor of an appropriately large design. For example, for a restraint system having 6 triggering circuits and a power consumption of, for example, 100 mA, an electrolytic capacitor having a storage time of approximately 150 ms, with a unit volume of more than 5 cm$^3$, would be necessary. For even more than 6 triggering circuits, the necessary unit volume of an electrolytic capacitor would assume such a size that its installation in an airbag triggering device would be problematic.

If one assumes a restraint system having approximately 20 triggering circuits, the energy store must be capable of providing sufficient electrical energy for at least 5 seconds. For this time, for the number of triggering circuits mentioned, including a microcontroller driving the individual triggering circuits, a total power consumption of 300 mA must be made available. An object of the present invention is therefore to implement the requirements described with an energy store having the smallest possible unit volume.

SUMMARY OF THE INVENTION

According to the present invention, a capacitor arrangement used as an energy store comprises multiple double-layer capacitors connected in series and an electrolytic capacitor, which receives its charge from the double-layer capacitors, which have a higher capacitance but a lower nominal voltage than the electrolytic capacitor, and the electrolytic capacitor supplies the triggering voltages necessary for the trigger power modules of the protective devices.

Double-layer capacitors, whose properties are that they have a very high capacitance (more than 7 farads) and a long storage time (greater than 5 seconds), with the unit volume being approximately 3 cm$^3$, are known per se from U.S. Pat. No. 5,621,607. However, double-layer capacitors have a relatively low nominal voltage (approximately 2.3 V), which is too low for triggering a trigger power module of a restraint device. The electrolytic capacitor used in addition to the double-layer capacitors has a higher nominal voltage (approximately 63 V) than the double-layer capacitors and supplies a sufficiently high triggering voltage for the trigger power modules. Since the electrolytic capacitor is exclusively provided for the power supply of the trigger power modules, its capacitance of approximately 1.0 mF, which may be implemented with a relatively low unit volume (6.2 cm$^3$), is reliably sufficient. With the configuration of energy stores according to the present invention, the total unit volume is approximately 18 cm$^3$, which is significantly less (approximately 50 times) than if an energy store for a high number of triggering circuits (e.g., 20) has to be implemented with an electrolytic capacitor.

A voltage transformer is preferably connected to the series circuit of double-layer capacitors, which steps up the voltage which may be picked up at the double-layer capacitors to the charging voltage necessary for the electrolytic capacitor.

A particular advantage is that, in addition to the charging voltage for the electrolytic capacitor, the series circuit of double-layer capacitors also provides the supply voltage for a microcontroller which controls the trigger power modules of the protective device.

An ohmic resistor is expediently connected in parallel to each double-layer capacitor in order to symmetrize the voltages which may be picked up at the double-layer capacitors.

BRIEF DESCRIPTION OF THE DRAWING

The FIGURE shows the circuit arrangement according to the present invention.

DETAILED DESCRIPTION

Figure 1:
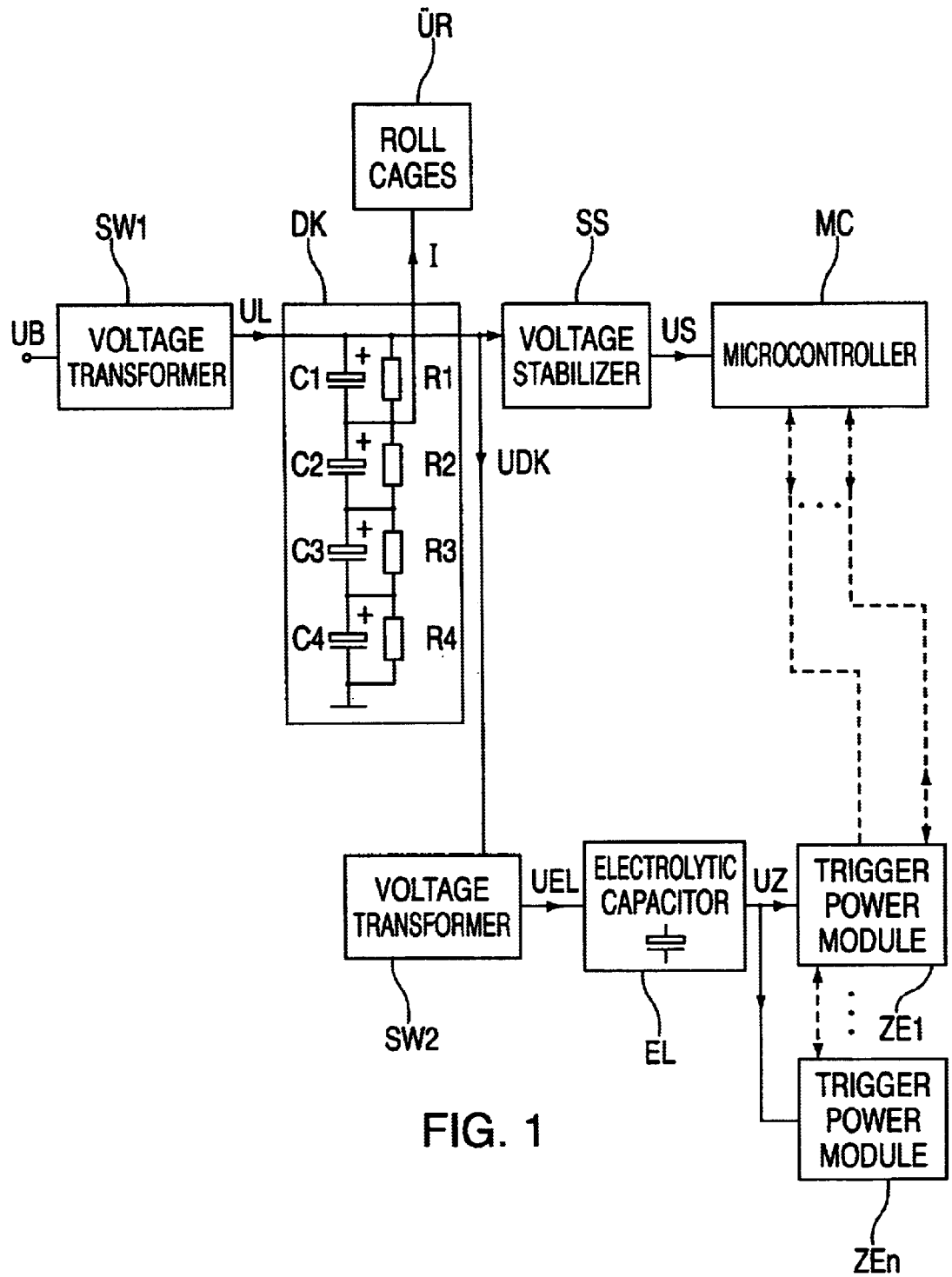

A block diagram of a circuit arrangement is illustrated in the FIGURE which supplies energy to multiple trigger power modules ZE1, . . . , ZEn of n restraint devices in a vehicle and a signal processor SP, which drives these trigger power modules.

The circuit arrangement for the power supply shown has a first energy store DK in the form of four double-layer capacitors C1, C2, C3, and C4 connected in series. Required charging voltage UL (e.g., 8.8 +/−0.4 V) for the series circuit of double-layer capacitors C1, . . . , C4 is made available by a voltage transformer SW1 (step up/step down voltage transformer) from battery voltage UB supplied by the vehicle battery.

The design and the properties of double-layer capacitors are described in U.S. Pat. No. 5,621,607. The electrodes of these double-layer capacitors are made of a composition of aluminum and carbon and therefore produce a relatively low internal ohmic resistance of the capacitor. A diluted sulfuric acid, for example, is used as the electrolytic material in the double-layer capacitors. Through the use of a chemically inert carbon material for the capacitor electrodes, an extremely enlarged surface of up to 3000 m$^2$/g may be achieved. Essential advantages of such double-layer capacitors are an extremely high capacitance of more than 7 F, a long storage time of more than 5 s, and a relatively small unit volume in connection with these advantages.

Since the nominal voltage of a double-layer capacitor is, however, not greater than 2.3 V, multiple such double-layer capacitors C1, . . . , C4 are connected in series, as shown in the drawing, so that total nominal voltage UDK which may be picked up at the series circuit is a multiple (fourfold in this case) of the nominal voltage of one single double-layer capacitor. The number of double-layer capacitors connected in series depends on what output voltage UDK is required from the energy store made of double-layer capacitors. A capacitor unit DK made of 4 double-layer capacitors C1, . . . , C4 would have a unit volume of a maximum of 11.5 $cm^3$ at an overall average continuous current consumption of the restraint system of 0.5 A and a survival time (store time) of approximately 7 seconds.

Output voltage UDK picked up at series circuit DK of double-layer capacitors C1, . . . , C4 is supplied to a voltage transformer SW2, which steps up output voltage UDK to charging voltage UEL (e.g., 45 V) necessary for electrolytic capacitor EL. Triggering voltage UZ (and/or triggering current) for trigger power modules ZE1, . . . , ZEn present is picked up at electrolytic capacitor EL. If one assumes an electrolytic capacitor having a capacitance of 1.0 mF and a nominal voltage of 63 V and supposes that a maximum of 14 trigger power modules are to be triggered simultaneously, a peak current of approximately 17 A will be taken from electrolytic capacitor EL. For a direct current discharge resistance of this electrolytic capacitor EL of a maximum of 0.6 Ω, it drops internally by 10.2 V, so that 34.8 V is still applied in the first moment of triggering to the 14 trigger power modules to be triggered. After triggering of the 14 trigger power modules, each of which, taking their losses into consideration, requires a total of 21 mJ of energy, approximately 26 V of charging voltage still remains at electrolytic capacitor EL. This residual charging voltage is sufficient to perform a later triggering of further trigger power modules.

The charging voltage for electrolytic capacitor EL is picked up at the output of series circuit DK of the double-layer capacitors, as is a supply voltage US for a microcontroller MC, which controls trigger power modules ZE1, . . . , ZEn and possibly also performs a fault diagnosis. A voltage stabilizer SS preferably obtains a stable supply voltage US for microcontroller MC from output voltage UDK of series circuit DK of double-layer capacitors C1, . . . , C4.

An ohmic resistor R1, R2, R3, and R4 (e.g., with a resistance of 5 kΩ) is preferably connected in parallel to each individual double-layer capacitor C1, C2, C3, and C4. These resistors R1, . . . . R4 are used to symmetrize the capacitor voltages, so that the same voltage is available at each capacitor C1, . . . , C4 and a specified nominal voltage is not exceeded.

As may be inferred from the exemplary embodiment shown in the drawing, a current I may also be picked up at the series circuit of resistors R1, . . . , R4, with which one or more magnets for activating one or more roll cages ÜR may be supplied.

The arrangement of a first energy store made of multiple double-layer capacitors and a second energy store in the form of an electrolytic capacitor (preferably an aluminum electrolytic capacitor) described above ensures high availability of the protective function of all necessary passenger protection devices, even in the event of multiple impacts of varying types—e.g., frontal and subsequent side crash, frontal and subsequent rear impact, or side crash and subsequent rollover, etc.

What is claimed is:

1. A circuit arrangement for a power supply of at least one protective device for at least one vehicle passenger, comprising:

a capacitor arrangement for providing an energy necessary for triggering the protective device, the capacitor arrangement including a plurality of double-layer capacitors connected in series and an electrolytic capacitor, the electrolytic capacitor obtaining a charge from the double-layer capacitors, the double-layer capacitors having a higher capacitance but a lower nominal voltage than the electrolytic capacitor, the electrolytic capacitor supplying a triggering voltage necessary for a trigger power module of the protective device.

2. The circuit arrangement according to claim 1, further comprising a voltage transformer connected to the double-layer capacitors, the voltage transformer stepping up a voltage picked up at the double-layer capacitors to a charging voltage necessary for the electrolytic capacitor.

3. The circuit arrangement according to claim 1, further comprising a microcontroller for controlling the trigger power module of the protective device, the double-layer capacitors providing a supply voltage for the microcontroller.

4. The circuit arrangement according to claim 1, further comprising a plurality of ohmic resistors, each of the ohmic resistors being connected in parallel to a corresponding one of the double-layer capacitors to symmetrize voltages occurring at the double-layer capacitors.

* * * * *